May 10, 1955 H. T. HOLZWARTH 2,707,919
TURBO-PUMP SETS
Filed Dec. 27, 1950 2 Sheets-Sheet 1
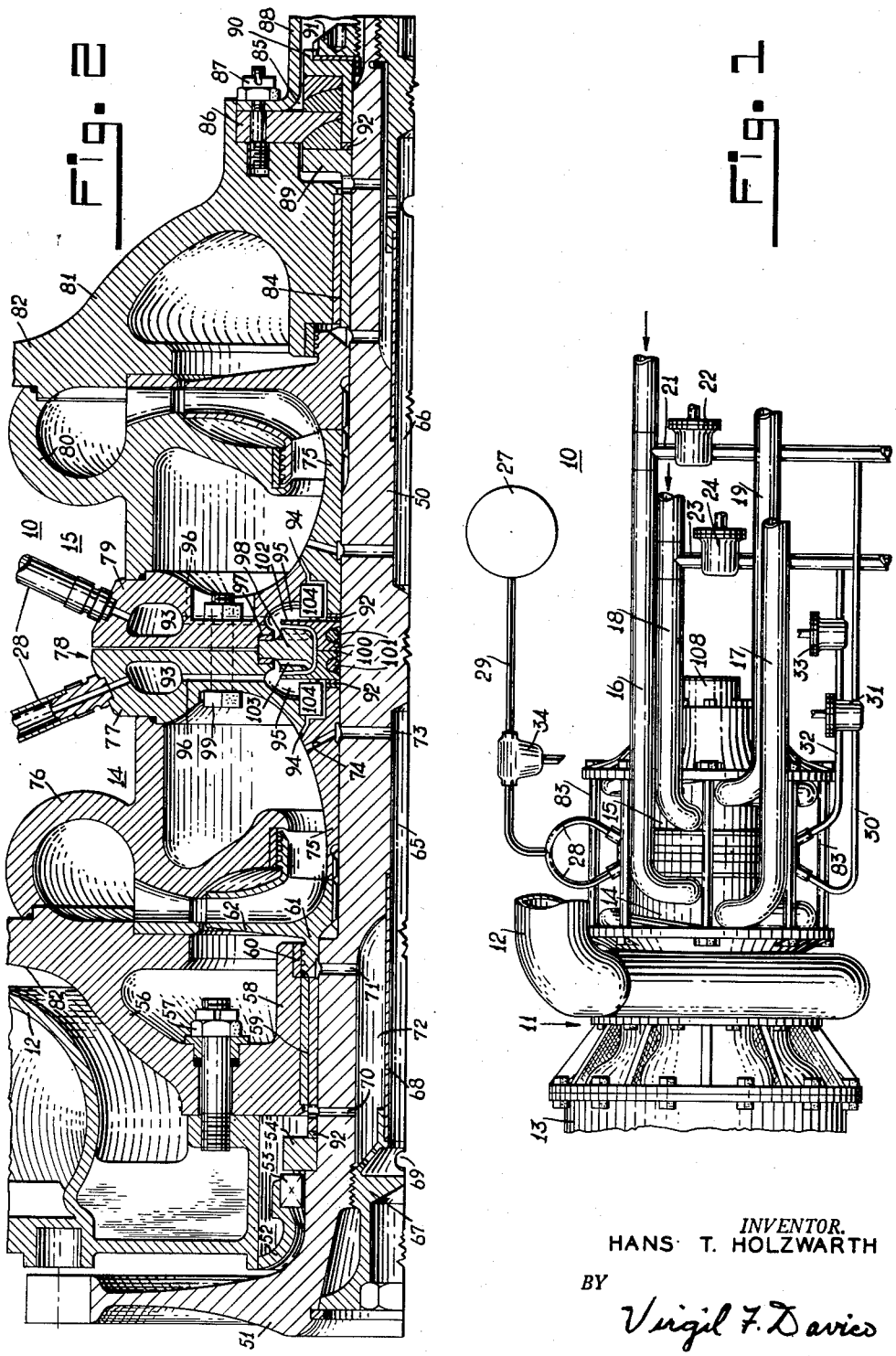
INVENTOR.
HANS T. HOLZWARTH
BY Virgil F. Davies
ATTORNEY May 10, 1955
H. T. HOLZWARTH
2,707,919
TURBO-PUMP SETS
Filed Dec. 27, 1950
2 Sheets-Sheet 2
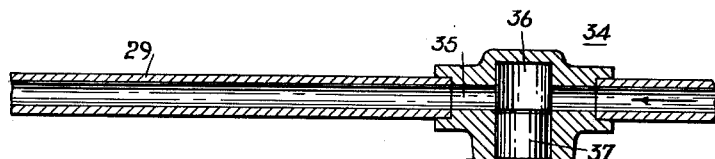
Fig. 3
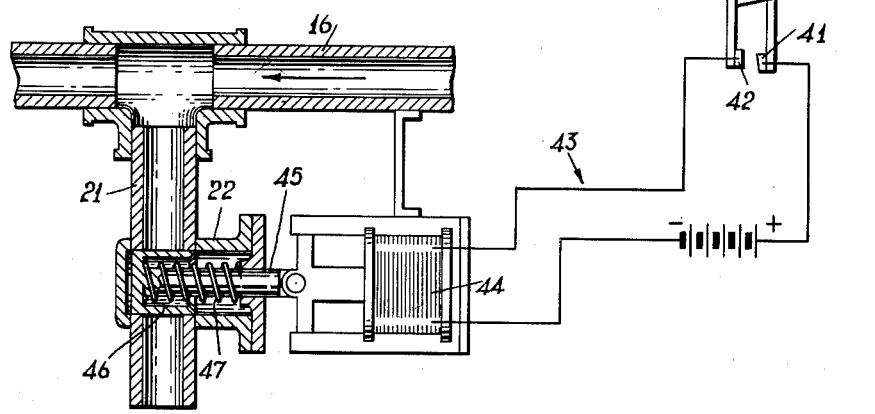
Fig. 4
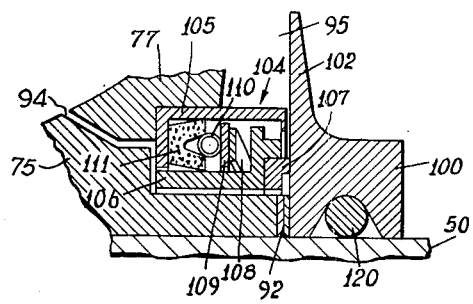
INVENTOR.
HANS T. HOLZWARTH
BY
Virgil F. Davres
ATTORNEY

United States Patent Office 2,707,919
Patented May 10, 1955

2,707,919

TURBO-PUMP SETS

Hans T. Holzwarth, Westfield, N. J., assignor to The M. W. Kellogg Company, Jersey City, N. J., a corporation of Delaware Application December 27, 1950, Serial No. 202,875

9 Claims. (Cl. 103—6)

This invention relates to turbo-pump sets of the character employed in liquid propellant rocket motors.

Liquid rocket propellants usually comprise a fuel component such as a liquid hydrocarbon and an oxidizing component such as highly concentrated nitric acid. The nature of the liquid propellant components is always such that they cannot be permitted to intermix except in the power generating chamber of the rocket without risking destruction of the rocket. Consequently, it is essential that the components be isolated one from the other in storage and in the pumping systems through which they pass on their way to the power generating chamber. The sealing of the pumping systems against leakage of the components presents a problem of major difficulty, particularly since the size and weight requirements of the pumping systems are of extreme importance and have a direct bearing on the range of the rocket.

It is also of extreme importance to insure against the intermingling of the components of the liquid rocket propellant which may result from failure or malfunction of the elements of the pumping system. This is particularly true when the rocket motor is large and expensive and is intended for repeated use or is a permanent part of a vehicle such as an airplane.

It is a principal object of this invention to provide a simple and compact pumping system for the components of a liquid rocket propellant which is of simple design, occupies a minimum of space, is of minimum weight and which insures against intermingling of the propellant components prior to their entrance into the power generating chamber of the rocket.

It is also a principal object of this invention to provide a pumping system for the components of a liquid rocket propellant which includes an overhung turbine wheel and two pumps straddling the turbine shaft and driven thereby, the intake ends of the pumps being arranged to face each other and sealing arrangements being provided at the intake ends of said pumps which insure against leakage from the several intake ends during normal operation of the pumping system.

It is also an important object of this invention to provide a pumping system for the components of a liquid rocket propellant which includes two pumps straddling a common drive shaft and with their intake ends arranged to face each other, an inert gas pressurized sealing arrangement being provided which insures against leakage from the several ends during normal operation of the pumping systems, and an arrangement for dumping the components without intermingling thereof in the rocket being provided which is automatically operatable upon failure or malfunction of the components of the pumping system.

The further objects, features, and advantages of the invention will be apparent from the following description of a preferred embodiment thereof, taken with the accompanying drawings, in which:

Fig. 1 is a front view of a pumping system embodying the present preferred embodiment of the invention;

Fig. 2 is a fragmentary sectional view of the system of Fig. 1;

Fig. 3 is a part sectional diagrammatic view of the dumping arrangements employed; and Fig. 4 is an enlarged sectional view of the sealing ring arrangements shown in Fig. 1.

While the novel pumping system of the invention is of general application and may be used in the pumping of any two liquids which because of their character, or use, cannot be intermixed, as is quite common in the chemical arts, it will be particularly described as the pumping system of a liquid propellant rocket motor of the kind incorporated in airplanes for take-off assistance.

The pumping system 10 includes a gas turbine 11 supplied with gases through a conduit 12 from a gas generator, not shown. The turbine exhaust passes out of the system through a conduit 13. Besides the turbine 11 are the liquid propellant component pumps 14 and 15. The pump 14 receives its liquid propellant components from a reservoir, not shown, through the inlet pipe 16 and passes it to the power chamber, not shown, through the outlet pipe 17. The pump 15 receives its liquid propellant component from a second reservoir, not shown, through the inlet pipe 18 and passes it to the power chamber through the outlet pipe 19. The inlet line 16 is connected to a sump, not shown, by a line 21 having a dump valve 22 therein. A line 23 connects inlet line 18 to a second sump, not shown, and has a dump valve 24 therein.

The inlet ends of the pumps 14 and 15 face each other; a sealing arrangement, particularly described thereinafter, is provided between them. The sealing arrangement is pressurized by suitable inert gas, such as nitrogen, stored in the container 27. The gas is supplied to the sealing arrangement through the branches 28 of the line 29. The sealing arrangement is connected on the pump 14 side through a line 30 to the line 21, a dump valve 31 is included in the line 30, and on the pump 15 side through a line 32 to the line 23, a dump valve 33 is included in line 32. A pressure operated actuating device 34 opens in line 29 and operates when the pressure in line 29 falls below a predetermined minimum to cause the actuation of an electrical, or air, or hydraulic, train which opens all of the dump valves 22, 24, 31 and 33 to pass the components of the fluid propellant without danger of intermixing to their respective sumps.

Fig. 3 shows a simple arrangement, including an electrical circuit, for obtaining the result just mentioned. For the sake of simplicity only one of the dump valves, valve 22, is shown as all of said dump valves are alike; also, the electric circuit is arranged to operate only said one valve but it is to be understood that said circuit is to operate all of said valves. The device 34 includes the right angularly disposed bores 35 and 36. The pressurizing fluid passes through the bore 35 while the bore 36 accommodates a spring loaded piston 37. The spring 38 is so chosen that when the pressure in line 29 decreases to or below the pressure at the inlets of the pumps 14 and 15 the piston will move across the bore 35.

A switch 39 is supported from the body of the device 34 and includes a pivoted arm 40 which is spring urged to carry its contact 41 into engagement with the fixed contact 42 to close electrical circuit 43. This action is prevented by the piston rod 44 which prevents movement of the arm 40 as long as the pressure in the line 29 exceeds the predetermined minimum. The circuit 43 includes the solenoid 44 whose movable core is connected to one end of the piston rod 45. At its other end the piston rod 45 carries a piston 46. A spring 47 normally maintains piston 46 across line 21. When the electric circuit 43 is closed the solenoid core will retract the piston 46 to open line 21 and thereby permit the component flowing through line 16 to pass to its sump. Thus, when the switch 39 is closed all of the dump valves 22, 24, 31 and 33 are opened and the liquid propellant components separately pass to their respective sumps without danger of intermingling.

The pumping system 10 includes a turbine shaft 50 having formed integral with one end thereof the turbine wheel 51 which is driven by the gases received from the manifold 12. The casing of the turbine encircles the shaft 50 and includes an annular web 52 having one end bored to carry the nose seal 53. The nose of seal 53, to be particularly described hereinafter, bears on a mating ring 54 carried by the shaft 50. The portion 56 of the casing of the pump 14 is secured to the turbine casing by means of the threaded studs and nuts 57 which are distributed on a circle concentric with the shaft 50. The casing portion 56 includes an annular web 58 which carries one sleeve of the bearing 59, the other sleeve being carried by the shaft 50. The web 58 also carries a bearing sleeve 60 which cooperates with a labyrinth 61 carried by the impeller 62 of the pump 14. The impeller 62 is provided with suitable vanes and is splined on the shaft 50. The bearing and labyrinth arrangement 60, 61, acts as a barrier and reduces the pressure of the component of the liquid propellant that reaches the sleeves of the bearing 59.

The shaft 50 is provided with non-communicating axial bores 65 and 66. The enlarged end of the bore 65 is closed by a cap 67 which carries a sleeve 68 having a circular series of holes 69 therein. The predetermined amount of the component that passes the labyrinth bearing seal 61, 60 serves to cool the bearing 59 and the turbine end of the shaft 50, and after performing this function passes through the circular series of radial bores 70 and 71 into the chamber 72. From this chamber the component passes through the holes 69 into the central bore 65 and from thence through the circular series of radial bores 73 and the circular series of bores 74 into the inlet space of the pump 14. The bores 74 are formed in a profiled sleeve 75 splined to the shaft 50. By reason of the component circulation arrangement just described, the pressure at the seal 53, 54 is much less than the pump outlet pressure so that at the worst the leakage past said seal can only be minor; in any event, any leakage that takes place passes to the turbine outlet and cannot come into contact with the other component of the liquid propellant.

The main portion 76 of the casing of the pump 14 bears against the portion 56 and against the half 77 of a ring diaphragm 78. The joint between the casing portions 56 and 76 and the joint between casing portion 76 and diaphragm 78 are stepped and appropriately sealed to prevent leakage therethrough. The other half 79 of the diaphragm 78 bears against the main portion 80 of the casing of pump 15 which in turn bears against the portion 81 of said pump casing. The joint between casing portions 80 and 81 and the joint between the diaphragm half 79 and the casing portion 80 are stepped and provided with seal rings of comparatively soft material to prevent leakage therethrough. The casing portions 56 and 81 have outwardly extending flanges 82 through which pass a series of stay bolts 83 which when tightened form the pump assembly into a rigid unit.

The pump 15 as well as the arrangements for circulating controlled amounts of its component through the bearing 84 at the high pressure end thereof and for returning said component to the pump inlet are similar to the pump 14 and its component circulating arrangements; consequently, the pump 15 and its component circulating arrangements will not be described in detail.

At the end of the shaft 50 and adjacent the bearing 84 is a thrust bearing 85 which includes a stationary element 86 anchored to the casing portion 81 by a circular series of bolts 87 which also hold the sealing cap 88 in place. The inner sleeve of the bearing 84 includes an extending flange 89 which abuts the rotary element of the thrust bearing 85. The rotary elements of the thrust bearing 85 are carried on a flanged sleeve 90 which bears against the nut 91 threaded on the shaft 50. By tightening the nut 91 the elements carried on the shaft 50 may be moved into their proper positions and the necessary clearances obtained. To aid in accurately positioning said elements shim rings 92 are employed. The cap 88 seals the high pressure end of the pump 15 and its end of the shaft 50 against leakage of the component handled by the pump 15.

The halves 77 and 79 of the diaphragm 78 are substantially mirror images of each other and each includes an annular chamber 93 into the top of which opens the respective one of pressurizing lines 28 and into the bottom of which opens the respective one of sump lines 30 and 32. The inner portion of each half 77 and 79 extends to its respective one of sleeve elements 75 and is spaced therefrom by a narrow gap 94. The inner portion of each half 77 and 79 also includes a hollow which when the remainder of the elements to be described are in position forms an annular chamber 95. The chambers 93 and 95 are in communication through a plurality of radial bores 96. At the outer end of chambers 95, the halves 77 and 79 are formed with annular grooves whose radial sides are lined with the rings 97, of comparatively soft metal. The rings 97 engage the outwardly extending flange formed as a part of the ring 98. The bolts 99, equally spaced around a circle, clamp the halves 77 and 79 together and cause the rings 97 to bear on the flange of the ring 98 to form a fluid-tight joint therebetween.

Beneath the ring 98 are the mating rings 100 which encircle the shaft 50. Each of the rings 100 includes a groove which receives an O ring 101 of suitable deformable material to seal the joint between the mating ring 100 and the shaft 50. Each ring 100 includes an outwardly extending slinger flange 102. The ring 98 is shaped to fit between the rings 100 and their flanges 102 and is separated therefrom by a narrow gap just wide enough to prevent interference between said rings 100 and the ring 99 during rotation of said rings 100. The ring 98 has a circular series of radial bores 103 on each side thereof. Nose-seals 104 are carried by halves 77 and 79 and bear against the mating rings 100 to provide a flow barrier between the inlets of pump 14 and 15 and the chambers 95.

The seals 53 and 104 are alike and may be of any suitable form, at present the form shown in Fig. 4 is preferred. The seal 104 includes nesting flanged rings 105 and 106. The ring 106 carries the nose ring 107 which bears on the surface of mating ring 100 to form the barrier during operation between passageway 94 and chamber 95. A spring 108 bears on the flange of ring 106 and on a washer 109 which in turn bears on a helical spring ring 110 located in the cleft of a V-shaped deformable sealing ring 111 that seals the space between the rings 105 and 106.

The gas supply container 27, through the line 29 and the branches 28, imposes a pressure on the chambers 93 and 95 greater than the pressure at the inlets of the pumps 14 and 15. If the seals 104 and the mating rings 100 are faulty through any cause and do not present an effective barrier, the pressurizing gas will leak from the chamber or chambers 95 into the inlet or inlets of the respective pumps 14 and 15 rather than the components of the liquid propellant leak into the chamber or chambers 95. When due to this leakage, or due to the failure of the chamber 27, or the lines 28 and 29, the gas pressure in the chambers 93 falls to or below the pressure at the inlets of the pumps 14 and 15, the spring 38 will overcome the pressure on the face of the piston 37 and will move said piston across the line 29. This movement of the piston 37 will carry the piston rod 44 away from the lever 40 and the switch 39 will close the circuits of the solenoids 40 to open dump valves 22, 24, 31 and 33 and thus place the pump inlet lines 16 and 18 in open communication with their respective sumps so that there can be no further flow into the pumps 14 and 15. These actions have no effect on the turbine 11 and the shaft 50 will continue its rotation. Since the pressure at the inlets of the pumps 14 and 15 will now equal or exceed that in the chambers 95 the leakage will be from said inlets to said chambers. As either or both of the components pass their respective nose rings 107 they are picked up by their respective mating rings 100 and slingers 102 and are thrown outwardly to the walls of their respective chambers 95 and through their respective bores 96 into their respective chambers 93. From thence the components will separately pass into their respective dump lines 30 and 32 and to their respective sumps without possibility of coming into contact one with the other. The possibility of pumping from one chamber 95 to the other through the space between ring 98 and the mating rings 100 and slingers 102 is prevented by the pressure equalizing effect of the bores 103 in each side of the ring 98. Because of the bores 103 any pumping action in the space between one of the slingers 102 and ring 98 can only result in the circulation through said bores and said space of the medium in space 95 on the side of the particular slinger 102.

It is apparent that many different embodiments of this invention may be made without departing from the spirit and scope thereof and it is not intended to be limited except as indicated in the appended claims.

I claim:

1. In a pump set, a pair of pumps arranged with their inlet ends adjacent one to the other, said pumps including casing members and rotatable members, bearings in the outlet ends of said casing members, a drive shaft passing through said casing members and supported in said bearings, said rotatable members mounted on said shaft for rotation therewith, an annular diaphragm between said pumps closing the inlet ends of said pumps, said diaphragm engaging said casing members and encircling said rotatable members at the inlet ends of said pumps, seal means at the inlet end of each of said pumps between said diaphragm and said rotatable members, and means normally imposing a pressure on said seal means equal to or greater than the pressure within the inlet ends of said pumps.

2. In a pump set, a pair of pumps arranged with their inlet ends adjacent one to the other, said pumps including casing members and rotatable members, bearings in the outlet ends of said casing members, a drive shaft passing through said casing members and supported in said bearings, said rotatable members mounted on said shaft for rotation therewith, an annular diaphragm between said pumps closing the inlet ends of said pumps, said diaphragm engaging said casing members and encircling said rotatable members at the inlet ends of said pumps, seal means at the inlet end of each of said pumps between said diaphragm and said rotatable members, said seal means and said diaphragm defining a separate seal chamber adjacent the inlet end of each of said pumps, a pair of separate annular chambers adjacent the outer periphery of said diaphragm, said diaphragm having two series of radial passageways therein, each of said series communicating one of said peripheral chambers with one of said seal chambers, means conducting a pressurizing medium to each of said peripheral chambers, and means for separately conducting fluid from each of said peripheral chambers to a point of disposal.

3. In a pump set, a pair of pumps arranged with their inlet ends adjacent one to the other, each of said pumps including main and outlet end casing sections and an inlet end rotatable member, bearings in the outlet end casing section of each of said pumps, a drive shaft passing through said casing sections of said pumps and supported in said bearings, said inlet end rotatable members mounted for rotation on said shaft, an annular diaphragm between said pumps closing said main casing sections and encircling said inlet end rotatable members, said diaphragm having a pair of annular recesses opening at the inner periphery thereof and separated by an inwardly extending portion of said diaphragm, a seal member at the inlet end of each of said pumps carried by said diaphragm, a two-part mating ring element mounted on said shaft between said seals and exposing a radial surface to each of said seals, a member carried by each of said seals and adapted to contact the radial surface exposed to its respective seal, said radial surfaces being defined in part by flanges extending radially outwardly from the body of said two-part mating ring, said diaphragm extension fitting between the flanges of said two-part mating ring to isolate said peripheral recesses, said diaphragm having a pair of annular chambers adjacent the periphery thereof and two series of radial bores therein each of said series of bores communicating one of said peripheral chambers with one of said inner peripheral recesses, means for conducting a pressurizing medium to each of said annular chambers, and means for separately conducting fluid from each of said annular chambers to a point of disposal.

4. In a pump set, a pair of pumps arranged with their inlet ends adjacent one to the other, each of said pumps including main and outlet end casing sections and an inlet end rotatable member, bearings in the outlet end casing sections of each of said pumps, a drive shaft passing through said casing sections of said pumps and supported in said bearings, said inlet end rotatable members mounted for rotation on said shaft, an annular diaphragm between said pumps closing said main casing sections and encircling said inlet end rotatable members, said diaphragm being formed of complementary halves, each of said halves having an annular recess opening at the inner periphery thereof, an annular chamber adjacent the outer periphery thereof and a series of radial bores connecting said recess with said chamber, means conducting a pressurizing medium to each of said chambers, and means for conducting fluid separately from each of said chambers to a point of disposal, a seal member at the inlet end of each of said pumps and carried by the respective half of said diaphragm, a mating ring for each of said seal members mounted for rotation on said shaft and presenting a radial surface to its respective seal, each of said radial surfaces being formed in part by a slinger flange extending from its respective mating ring, each of said seal members including a nose member adapted to bear on the radial surface of its respective mating ring, and a ring carried between said diaphragm halves and adapted to encircle said mating rings to separate said recesses.

5. In a pump set, a pair of pumps arranged with their inlet ends adjacent one to the other, each of said pumps including main and outlet end casing sections and an inlet end rotatable member, bearings in the outlet end casing sections of each of said pumps, a drive shaft passing through said casing sections of said pumps and supported in said bearings, said inlet end rotatable members mounted for rotation on said shaft, an annular diaphragm between said pumps closing said main casing sections and encircling said inlet end rotatable members, said diaphragm being formed of complementary halves, each of said halves having an annular recess opening at the inner periphery thereof, an annular chamber adjacent the outer periphery thereof and a series of radial bores connecting said recess with said chamber, means conducting a pressurizing medium to each of said chambers, and means for separately conducting fluid from each of said chambers to a point of disposal, a seal member at the inlet end of each of said pumps and carried by the respective half of said diaphragm, a mating ring for each of said seal members mounted for rotation on said shaft and presenting a radial surface to its respective seal, said radial surface being formed in part by a slinger flange extending from said mating ring, each of said seal members including a nose member adapted to bear on the radial surface of its respective mating ring, a ring carried between said diaphragm halves and adapted to encircle said mating rings to separate said recesses, said ring having a series of radial bores on each side thereof, said bores opening adjacent the base of the flange of its respective mating ring, and means clamping the halves of said diaphragm into a unit.

6. In a pump set, a pair of pumps mounting a common driving shaft and arranged with their inlet ends adjacent one to the other, a separate fluid inlet line opening into the inlet end of each of said pumps, a separate sump line connected to each of said fluid inlet lines, a normally closed dump valve in each of said sump lines, sealing means at the inlet end of each of said pumps, collecting means for each of said sealing means for separately collecting the fluid leaking past said sealing means, a fluid transfer line connecting each of said collecting means to the sump line of its respective pump, a normally closed dump valve in each of said fluid transfer lines, means normally imposing a pressure on each of said sealing means equal to or greater than the pressure at the pump inlets, and means effective to open all of said dump valves when said imposed pressure falls below a predetermined minimum to cut off the supply of fluid to the pump and to separately remove the fluid from the respective pumps.

7. In a pump set, a pair of pumps mounting a common drive shaft and arranged with their inlet ends adjacent one to the other, a separate fluid inlet line opening into the inlet end of each of said pumps, a separate sump line connected to each of said fluid inlet lines, a normally closed dump valve in each of said sump lines, sealing means at the inlet end of each of said pumps, collecting means for each of said sealing means, in communication therewith and adapted to separately collect the fluid leaking past said sealing means, a fluid transfer line connecting each of said collecting means to the sump line of its respective pump, a normally closed dump valve in each of said fluid transfer lines, a source of pressurized gas, a gas line for connecting said source to said collecting means, a pressure operated device in said gas line including an element adapted to move from one position to another when the pressure in said gas line reaches a predetermined minimum, and means adapted to be set into operation when said element moves from said one position to said other position to open all of said dump valves.

8. In a pump set, a pair of pumps mounting a common drive shaft and arranged with their inlet ends adjacent one to the other, a separate fluid inlet line opening into the inlet end of each of said pumps, a separate sump line connected to each of said fluid inlet lines, a normally closed dump valve in each of said pump lines, sealing means at the inlet end of each of said pumps, collecting means for each of said sealing means in communication therewith and adapted to separately collect the fluid leaking past said sealing means, a fluid transfer line connecting each of said collecting means to the sump line of its respective pump, a normally closed dump valve in each of said fluid transfer lines, a source of pressurized gas, a gas line for connecting said source to said collecting means, a pressure operated device in said gas line, and an electric circuit including means adapted when energized to open said dump valves, said pressure operated device including an element adapted to move to close said circuit when the pressure in said gas line falls to a predetermined minimum value.

9. In a pump set, a pair of pumps mounting a common drive shaft and arranged with their inlet ends adjacent one to the other, a separate fluid inlet line opening into the inlet end of each of said pumps, a separate sump line connected to each of said fluid inlet lines, a normally closed dump valve in each of said sump lines, sealing means at the inlet end of each of said pumps, collecting means for each of said sealing means in communication therewith and adapted to separately collect the fluid leaking past said sealing means, a fluid transfer line connecting each of said collecting means to the sump line of its respective pump, a normally closed dump valve in each of said fluid transfer lines, a source of pressurized gas, a gas line for connecting said source to said collecting means, a pressure operated device in said gas line, and an electric circuit including a switch and a solenoid for each of said dump valves adapted when energized to open said dump valves, said pressure operated device including a spring biased element adapted to move when the pressure in said line falls to a predetermined minimum to close said switch.

References Cited in the file of this patent

UNITED STATES PATENTS

| 1,408,291 | Haentjens | Feb. 28, 1922 |
| 1,787,088 | Schleyer | Dec. 30, 1930 |
| 1,904,320 | Marples | Apr. 18, 1933 |
| 2,246,912 | Baudry | June 24, 1942 |
| 2,366,629 | Kohler | Jan. 2, 1945 |
| 2,395,793 | Stratford et al. | Feb. 26, 1946 |
| 2,531,761 | Zucrow | Nov. 28, 1950 |
| 2,575,923 | McMahon et al. | Nov. 20, 1951 |
| 2,610,464 | Knoll | Sept. 16, 1952 |

FOREIGN PATENTS

| 304,786 | Great Britain | Feb. 6, 1930 |
| 316,807 | Great Britain | Aug. 8, 1929 |